(12) United States Patent
Wang et al.

(10) Patent No.: US 12,189,639 B2
(45) Date of Patent: Jan. 7, 2025

(54) METHOD OF PROCESSING INFORMATION, ELECTRONIC DEVICE, AND STORAGE MEDIUM

(71) Applicant: Beijing Baidu Netcom Science Technology Co., Ltd., Beijing (CN)

(72) Inventors: Yang Wang, Beijing (CN); Xunchao Song, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/182,986

(22) Filed: Mar. 13, 2023

(65) Prior Publication Data

US 2023/0229665 A1  Jul. 20, 2023

(30) Foreign Application Priority Data

Mar. 14, 2022  (CN) .......................... 202210249115.9

(51) Int. Cl.
  *G06F 7/00*       (2006.01)
  *G06F 16/22*      (2019.01)
  *G06F 16/2458*    (2019.01)

(52) U.S. Cl.
  CPC ...... *G06F 16/2471* (2019.01); *G06F 16/2228* (2019.01)

(58) Field of Classification Search
  CPC ............. G06F 16/2471; G06F 16/2228; G06F 16/951; G06F 16/9024; G06F 16/24561;
  (Continued)

(56) References Cited

U.S. PATENT DOCUMENTS 9,400,815 B2 *  7/2016  Poppitz ............. G06F 16/24561
2013/0339385 A1  12/2013  Abrams et al.
(Continued)

FOREIGN PATENT DOCUMENTS

CN  109559120  4/2019
CN  109710638  5/2019
(Continued)

OTHER PUBLICATIONS

Chinese Office Action, issued in corresponding Chinese Patent Application No. 202210249115.9, dated Apr. 20, 2023, 11 pages.
(Continued)

*Primary Examiner* — Mohammad A Sana
(74) *Attorney, Agent, or Firm* — HSML P.C.

(57) ABSTRACT

A method of processing an information, an electronic device, and a storage medium are provided, which relate to a field of an artificial intelligence technology, in particular to a field of a knowledge graph technology. An implementation includes: determining a first information, in response to receiving a first query request; querying an information associated with the first information from a current graph database, so as to obtain a first query result; determining at least one federation node, according to at least one of the first query result and the first information; and sending a second query request to the at least one federation node, so that the at least one federation node queries an information associated with a second information in the second query request from a graph database corresponding to the at least one federation node, so as to obtain at least one second query result.

19 Claims, 5 Drawing Sheets

(58) Field of Classification Search
CPC .. G06F 16/2456; G06F 16/245; G06F 16/322; G06F 16/9027; G06F 18/2337; G06F 18/2323; G06F 18/24323; G06F 2207/025; G06F 2207/02; G06F 2207/222; G06F 40/14; G06F 40/154
See application file for complete search history.

(56) References Cited

U.S. PATENT DOCUMENTS

| | | | |
|---|---|---|---|
| 2014/0164362 A1* | 6/2014 | Syed | G06F 16/904 707/722 |
| 2017/0371881 A1 | 12/2017 | Reynolds et al. | |
| 2018/0203908 A1* | 7/2018 | Katayama | G06F 16/2246 |
| 2018/0365289 A1 | 12/2018 | Brown et al. | |
| 2018/0367557 A1* | 12/2018 | Brown | G06F 16/90335 |

FOREIGN PATENT DOCUMENTS

| | | |
|---|---|---|
| CN | 110765295 | 2/2020 |
| CN | 110769028 | 2/2020 |
| CN | 113193992 | 7/2021 |
| CN | 113297433 | 8/2021 |
| JP | 2018-116348 | 7/2018 |
| JP | 2020-194391 | 12/2020 |
| WO | 2020/054451 | 3/2020 |

OTHER PUBLICATIONS

Japanese Office Action issued in the corresponding Japanese Patent Application No. 2023-036603, dated Apr. 23, 2024, 9 pages including the translation.

* cited by examiner

METHOD OF PROCESSING INFORMATION, ELECTRONIC DEVICE, AND STORAGE MEDIUM

CROSS-REFERENCE TO RELATED APPLICATIONS

This application is claims priority to Chinese Application No. 202210249115.9 filed on Mar. 14, 2022, which is incorporated herein by reference in its entirety.

TECHNICAL FIELD

The present disclosure relates to a field of an artificial intelligence technology, in particular to a field of a knowledge graph technology. Specifically, the present disclosure relates to a method of processing an information, an electronic device, and a storage medium.

BACKGROUND

With a continuous development of a computer technology, a graph database, which is a non-relational database for storing a relational information between nodes using a graph theory, is widely used in knowledge graph, financial anti-fraud, social relationship mining and other fields.

SUMMARY

The present disclosure provides a method of processing an information, an electronic device, and a storage medium.

According to an aspect of the present disclosure, a method of processing an information is provided, including: determining a first information to be queried, in response to receiving a first query request; querying an information associated with the first information to be queried from a current graph database, so as to obtain a first query result; determining at least one federation node to be queried, according to at least one of the first query result and the first information to be queried; and sending a second query request to the at least one federation node to be queried, so that the at least one federation node to be queried queries, in response to receiving the second query request, an information associated with a second information to be queried contained in the second query request from a graph database corresponding to the at least one federation node to be queried, so as to obtain at least one second query result.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method described in the present disclosure.

According to another aspect of the present disclosure, a non-transitory computer-readable storage medium having computer instructions therein is provided, and the computer instructions are configured to cause a computer to implement the method described in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Figure 1:
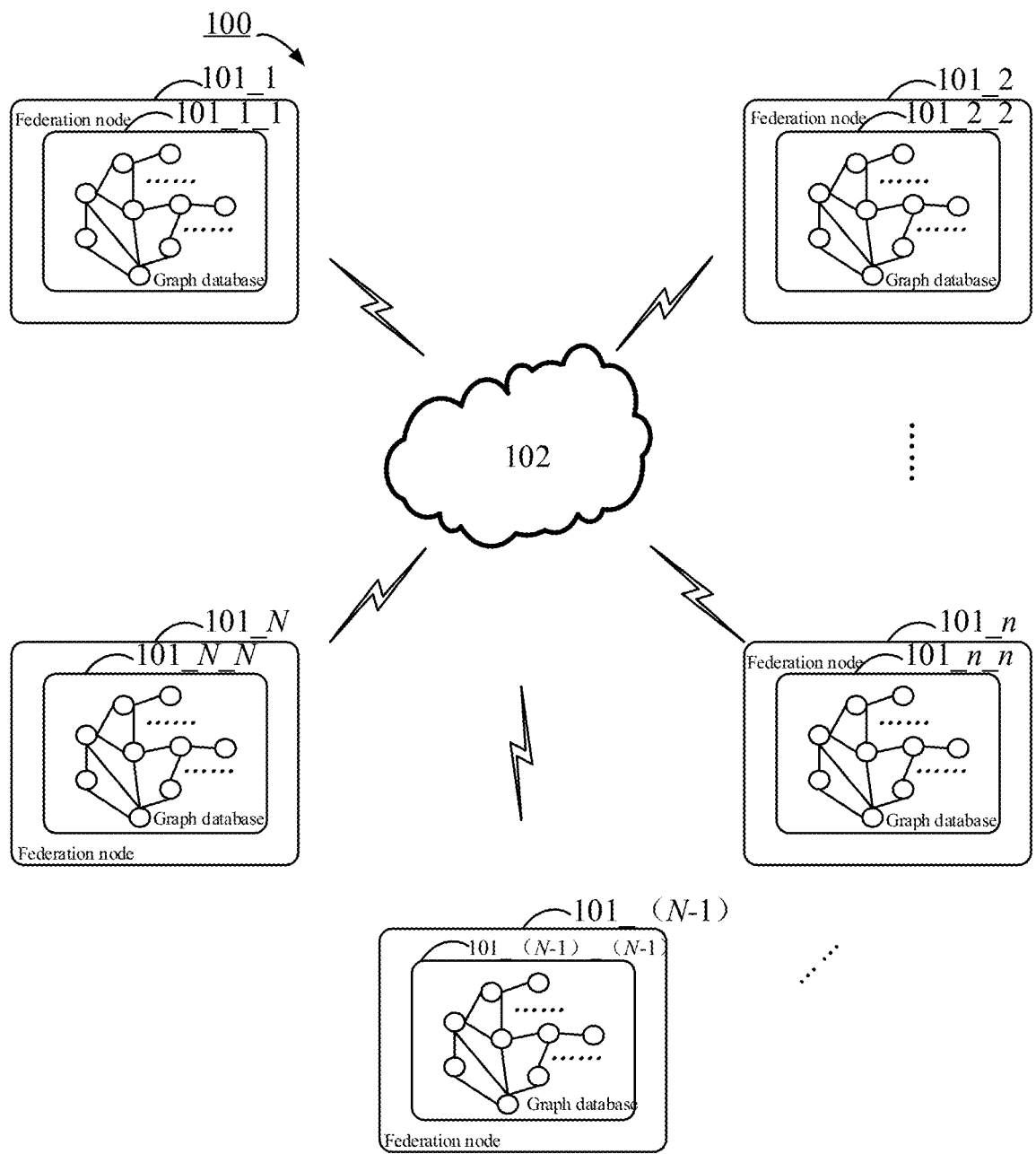
FIG. 1 schematically shows an exemplary system architecture to which a method and an apparatus of processing an information may be applied according to embodiments of the present disclosure.

Exemplary embodiments of the present disclosure will be described below with reference to accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

With a development of cross-domain service, a current object needs to efficiently acquire an information from other objects to complete an information query, that is, the current object needs to perform a cross-domain query efficiently, so as to make a decision according to an information obtained by the query. The current object does not know about other objects, and other objects need to keep data of a sensitive information involved confidential, that is, other objects need to ensure a data privacy. Therefore, it is difficult for the current object to directly acquire a relevant information from other objects, that is, it is difficult for the current object to perform a direct cross-domain query, so that an efficient cross-domain query may not be achieved. If the efficient cross-domain query is not achieved, it is difficult to efficiently discover a risk in the cross-domain service. The cross-domain service may include a cross-domain transaction service.

For example, an object A and an object B are both branches of an object C, and the object A and the object B are independent of each other. The object C has an information query permission to query an information in the object A and the object B. The object A and the object B have no information query permission to each other. The object A needs to query whether a cross-domain transaction between a transaction object a and a transaction object b exists in the object B. The object A does not have an information query permission to query from the object B, and the object C has the information query permission to query from the object B. Therefore, the object A may send an information query request to the object C. The information query request is a request of querying whether a cross-domain transaction between the transaction object a and the transaction object b exists in the object B. In response to a query result being received from the object C, the object A may determine whether a cross-domain transaction between the transaction object a and the transaction object b exists in the object B according to the query result.

Based on the above content, there is a need to efficiently perform a cross-domain query while ensuring a data privacy, so as to efficiently discover a risk in the cross-domain service.

To this end, embodiments of the present disclosure propose an information processing solution. That is, a first information to be queried is determined in response to a first query request being received. An information associated with the first information to be queried is queried from a current graph database to obtain a first query result. At least one federation node to be queried is determined according to at least one of the first query result and the first information to be queried. A second query request is sent to the at least one federation node to be queried, so that the at least one federation node to be queried queries, in response to the second query request being received, an information associated with a second information to be queried contained in the second query request from a graph database corresponding to the at least one federation node to be queried, so as to obtain at least one second query result.

Since different federation nodes may query their respective graph databases, the cross-domain query may be performed efficiently while ensuring the data privacy of different federation nodes, which is conducive to efficiently discovering a risk.

FIG. 1 schematically shows an exemplary system architecture to which a method and an apparatus of processing an information may be applied according to embodiments of the present disclosure.

It should be noted that FIG. 1 is merely an example of a system architecture to which embodiments of the present disclosure may be applied, so as to help those skilled in the art to understand the technical content of the present disclosure. It does not mean that embodiments of the present disclosure may not be applied to other devices, systems, environments or scenes.

As shown in FIG. 1, a system architecture 100 according to such embodiments may include a federation system 101 and a network 102. The federation system 101 may include N federation nodes, that is, the federation system 101 may include federation node 101_1, federation nodes 101_2, . . . , federation nodes 101_n, . . . , federation node 101_(N−1), and federation node 101_N. The federation node 101_n may have a graph database 101_n_n corresponding to the federation node 101_n. That is, the federation node 101_n may be provided with the graph database 101_n_n. Accordingly, the federation graph database may include a graph database 101_1_1, a graph database 101_2_2, . . . , a graph database 101_n_n, . . . , a graph database 101_(N−1)_(N−1), and a graph database 101_N_N. N may be an integer greater than 1. n ∈ {1, 2, . . . , (N−1), N}.

The network 102 is a medium for providing a communication link between different federation nodes. The federation node 101_n may achieve a communicative connection with all or part of other federation nodes in the federation system 101 through the network 102. The network 102 may include various connection types, such as wired and/or wireless communication links, and the like.

The federation node 101_n may independently manage the graph database 101_n_n corresponding to the federation node 101_n. For example, it is possible to change the graph database 101_n_n corresponding to the federation node 101_n, and it is possible to set a query open permission information of the graph database 101_n_n.

A federation architecture of the federation system 101 may include a single-level federation system or a multi-level federation system. The multi-level federation system may include a plurality of single-level federation systems, and at least two single-level federation systems with hierarchical relationships may exist in the multi-level federation system. The single-level federation system may refer to a federation system including one level.

The federation system 101 may include a leader federation node and at least one non-leader federation node. That is, a role of a federation node may include a leader federation node and a non-leader federation node. A role of the non-leader federation node may include a non-leader federation node with proposal permission and a non-leader federation node without proposal permission. The leader federation node may have a proposal permission. For the non-leader federation node without proposal permission, in a field of finance, an insurance company may be this type of federation node, because the insurance company needs to conduct a qualification review on an individual or a group, and needs a transaction information.

According to a manner of determining the leader federation node, the federation system 101 may be called a weak federation system or a strong federation system. If the leader federation node is determined based on an election method, the federation system 101 may be called a weak federation system. The leader federation node in the weak federation system 101 may be rotated according to a predetermined rotation strategy. If the leader federation node is preset, the federation system 101 may be called a strong federation system.

The federation node 101_n may be a server or a terminal device. The server may be various types of servers providing various services. For example, the server may be a cloud server, also known as a cloud computing server or a cloud host, which is a host product in a cloud computing service system to solve shortcomings of difficult management and weak service scalability existing in an existing physical host and VPS (Virtual Private Server) service. The server may also be an edge server. The server may also be a server of a distributed system or a server combined with a block-chain. The terminal device may be various electronic devices having a display screen and supporting web browsing, including but not limited to a smart phone, a tablet computer, a laptop computer, and a desktop computer.

The federation node 101_n may determine a first information to be queried in response to a first query request being received. An information associated with the first information to be queried may be queried from a current graph database (that is, the graph database 101_n_n) to obtain a first query result. At least one federation node to be queried may be determined according to at least one of the first query result and the first information to be queried. A second query request may be sent to at least one federation node to be queried, so that the at least one federation node to be queried queries, in response to the second query request being received, an information associated with a second information to be queried contained in the second query request from a graph database corresponding to the at least one federation node to be queried, so as to obtain at least one second query result.

It should be understood that a number of federation system, federation nodes and network in FIG. 1 is merely schematic. According to implementation needs, any number of federation systems, federation nodes and networks may be provided.

It should be noted that a sequence number of each operation in the following methods is merely used to represent the operation for ease of description, and should not be regarded as indicating an execution order of each operation. Unless explicitly stated, the methods do not need to be performed exactly in the order shown.

Figure 2:
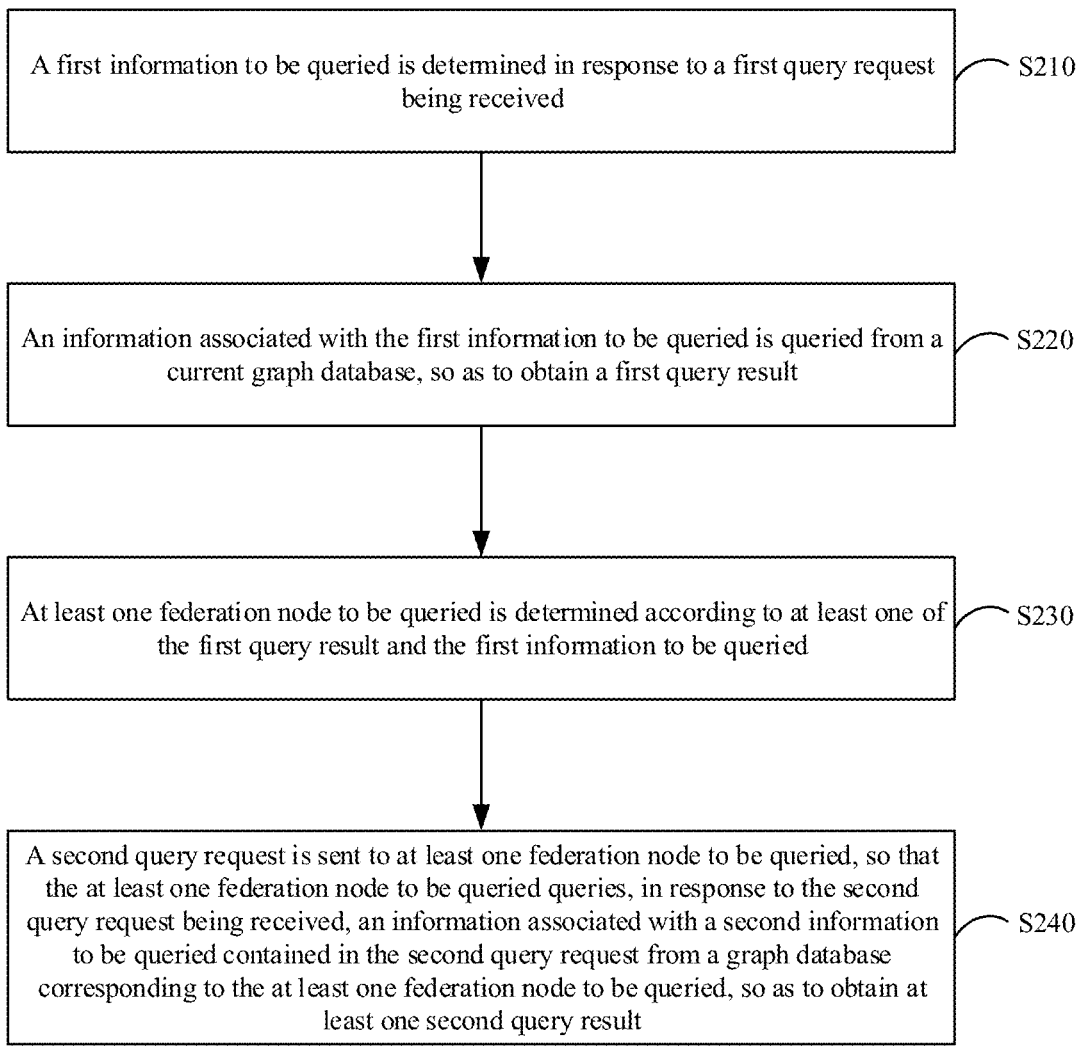
FIG. 2 schematically shows a flowchart of a method of processing an information according to embodiments of the present disclosure.

FIG. 2 schematically shows a flowchart of a method of processing an information according to embodiments of the present disclosure.

As shown in FIG. 2, a method 200 includes operation S210 to operation S240.

In operation S210, a first information to be queried is determined in response to a first query request being received.

In operation S220, an information associated with the first information to be queried is queried from a current graph database, so as to obtain a first query result.

In operation S230, at least one federation node to be queried is determined according to at least one of the first query result and the first information to be queried.

In operation S240, a second query request is sent to at least one federation node to be queried, so that the at least one federation node to be queried queries, in response to the second query request being received, an information associated with a second information to be queried contained in the second query request from a graph database corresponding to the at least one federation node to be queried, so as to obtain at least one second query result.

According to embodiments of the present disclosure, the federation system may include a plurality of federation nodes. The federation node may have a graph database corresponding to the federation node. The graph database may include a plurality of nodes and a plurality of edges. The graph databases of different federation nodes may contain the same or different nodes. The graph databases of different federation nodes may contain the same or different edges. The graph databases of different federation nodes may be managed separately. For example, the graph databases of different federation nodes may perform data changes independently. A current graph database may be a graph database corresponding to a current federation node. The federation node to be queried may have a graph database corresponding to the federation node to be queried.

According to embodiments of the present disclosure, a query request may refer to a request generated in response to at least one of a detected information to be queried and a query result for the information to be queried. The information to be queried may refer to an information that needs to be queried. The information may include one selected from an information regarding an existence and an information regarding a number-of-times. The information regarding an existence may be an information indicating whether an event exists or not. The information regarding a number-of-times may be an information indicating a number of occurrences of the event.

According to embodiments of the present disclosure, the first query request may refer to a query request received by the current federation node. The second query request may refer to a request generated by the current federation node according to at least one of the first information to be queried and the first query result for the first information to be queried. The first information to be queried may include at least one selected from a time period to be queried, a node to be queried, or an edge to be queried.

According to embodiments of the present disclosure, in response to receiving the first query request, the current federation node may parse the first query request to obtain the first information to be queried. The current federation node may determine at least one federation node to be queried from the federation system according to the first information to be queried. Alternatively, the current federation node may determine at least one federation node to be queried from the federation system according to the first query result. Alternatively, the current federation node may determine at least one federation node to be queried from the federation system according to the first query result and the first information to be queried.

According to embodiments of the present disclosure, if the federation node to be queried that needs to be called may be determined according to the first information to be queried, at least one federation node to be queried may be determined according to the first information to be queried. If the federation node to be queried that needs to be called may not be determined according to the first query information and the federation node to be queried that needs to be called may be determined according to the first query result, then the at least one federation node to be queried may be determined according to the first query result.

According to embodiments of the present disclosure, the current federation node may generate the second query request according to the first information to be queried. The current federation node may send the second query request respectively corresponding to the at least one federation node to be queried to the at least one federation node to be queried. The federation node to be queried may receive the second query request from the current federation node in a broadcast manner. Alternatively, the federation node to be queried may receive the second query request from the current federation node in a point-to-point manner. The federation node to be queried may parse the second query request in response to receiving the second query request from the current federation node, so as to obtain the second information to be queried. The federation node to be queried may query the information associated with the second information to be queried from the graph database corresponding to the federation node to be queried, so as to obtain the second query result.

According to embodiments of the present disclosure, since different federation nodes may query their respective graph databases, the cross-domain query may be performed efficiently while ensuring the data privacy of different federation nodes, which is conducive to efficiently discovering a risk.

According to embodiments of the present disclosure, the current graph database may include at least one data version identification, and a plurality of node information and at least one edge information corresponding to the data version identification. The node information includes at least one node label of a node and at least one node attribute corresponding to the node label. The edge information includes an edge label of an edge and at least one edge attribute corresponding to the edge label. The edge label indicates a relationship between two nodes connected by an edge.

According to embodiments of the present disclosure, the first information to be queried may include at least one selected from a time period to be queried, a node to be queried, or an edge to be queried.

According to embodiments of the present disclosure, the data version identification may indicate a data version. The data version may refer to data changed within a first predetermined time period. The data version identification may facilitate a query operation. The data version identification may be generated by a federation node with a predetermined role in the federation system. Any federation node in the federation system with a role except the predetermined role, when needs to change data in the graph database, may change data in the graph database in the first predetermined time period to obtain changed data. A version identification acquisition request may be sent to the federation node of the predetermined role, so that the federation node of the predetermined role determines the data version identification in response to receiving the version identification acquisition request. The federation node of the predetermined role may send the data version identification to the federation node. The federation node may store the data version identification and the changed data in an association manner in the graph database. In addition, the federation node may also store the data version identification and full data in an association manner in the graph database. The full data may include changed data and unchanged data. A form of the data version identification may be configured according to actual service requirements, which is not limited here. For example, the data version identification may contain a data version number. The data version number may increase over time.

For example, the data version identification may be generated by the leader federation node in the federation system based on a predetermined generation policy. The predetermined generation strategy may refer to a strategy for performing a generation operation every second predetermined time period. The second predetermined time period may be configured according to actual service requirements, which is not limited here. For example, the leader federation node may perform an operation of generating a data version identification every hour.

According to embodiments of the present disclosure, a node may be represented by a node identification. At least one node label may correspond to the node. At least one node attribute may correspond to the node label. The node label may be a label related to a field of finance or a label related to a field of communication. For example, two node labels corresponding to a node are individual and organization respectively. Two node attributes corresponding to the individual are contact information and identity respectively. Two node attributes corresponding to the organization are organization identification and organization service type respectively.

According to embodiments of the present disclosure, an edge may be represented by an edge identification. An edge label may correspond to the edge. The edge label may indicate a relationship between two nodes connected by the edge corresponding to the edge label. The relationship may include a transaction relationship. The transaction relationship may include at least one selected from a transfer, a payment, a borrow, a loan, a deposit, a mortgage, or an opening. At least one edge attribute may correspond to the edge label. For example, the edge label corresponding to the edge may be a transfer. Two edge attributes may correspond to the transfer, and the two edge attributes are transfer time and transfer value respectively. For another example, the edge label corresponding to the edge may be a borrow. Two edge attributes may correspond to the borrow, and the two edge attributes are borrow time and borrow value respectively.

According to embodiments of the present disclosure, for the data in the graph databases of different federation nodes, the data version limits an update time, and the data is not forced to be up-to-date and consistent. Therefore, if the current federation node acquires a plurality of data for a same object from different federation nodes, it is needed to determine target data from the plurality of data. This may be solved by the following authoritative authentication methods.

One method is a weight authentication, that is, data corresponding to a federation node with a greatest node weight is determined as the target data.

Another method is a self-authentication, that is, own data is determined as the target data.

Another method is an algorithmic authentication, that is, the target data is determined according to an algorithm. For example, the target data may be determined according to a data update time.

According to embodiments of the present disclosure, the first information to be queried may include at least one selected from: a first time period to be queried, a first node to be queried, or a first edge to be queried. The second information to be queried may include at least one selected from: a second time period to be queried, a second node to be queried, or a second edge to be queried. The second time period to be inquired may be the same as or different from the first time period to be inquired.

According to embodiments of the present disclosure, the first information to be queried may include the time period to be queried and the node to be queried.

According to embodiments of the present disclosure, operation S220 may include the following operations.

At least one target data version identification corresponding to the time period to be queried is determined from at least one data version identification contained in the current graph database. An information associated with the node to be queried is queried from a plurality of nodes corresponding to the at least one target data version identification, so as to obtain the first query result.

According to embodiments of the present disclosure, a time period may have an association relationship with the data version identification. The first information to be queried may include a first time period to be queried and a first node to be queried.

According to embodiments of the present disclosure, the at least one first target data version identification corresponding to the time period to be queried may be determined from the at least one data version identification according to the time period to be queried and at least one association relationship. The association relationship may indicate a relationship between the time period and the data version identification. After the at least one first target data version identification is determined, it is possible to determine, for each first target data version identification in the at least one first target data version identification, an information associated with the first node to be queried from the plurality of nodes corresponding to the first target data version identification. A first query sub-result may be obtained according to the information associated with the first node to be queried, so that the first query sub-result(s) respectively corresponding to the at least one first target data version identification may be obtained. The first query result may be obtained according to the first query sub-result(s) respectively corresponding to the at least one first target data version identification.

According to embodiments of the present disclosure, the second query request may include the second information to be queried. The second information to be queried may include a second time period to be queried and a second node to be queried.

According to embodiments of the present disclosure, the at least one federation node to be queried querying, in response to receiving the second query request, an information associated with the second information to be queried contained in the second query request from the graph database corresponding to the at least one federation node to be queried so as obtain at least one second query result may include the following operations.

For each federation node to be queried in the at least one federation node to be queried, the federation node to be queried determines at least one second target data version identification corresponding to the second time period to be queried, from the at least one data version identification contained in the graph database corresponding to the federation node to be queried. An information associated with the second node to be queried is queried from a plurality of nodes corresponding to the at least one second target data version identification, so as to obtain at least one second query sub-result. At least one second query result may be obtained according to the at least one second query sub-result.

According to embodiments of the present disclosure, operation S230 may include the following operations.

The at least one federation node to be queried is determined according to a query open permission information and one of the first query result and the first information to be queried.

According to embodiments of the present disclosure, the query open permission information may include an information for which a query permission is opened by a federation node in the federation system. The information for which the query permission is opened may include at least one selected from: a node attribute, an edge attribute, a node label, an edge label, a path, or a graph. The query permission may include a "yes or no" permission. For example, the query permission corresponding to the path may include "is there a first predetermined node?" and "is there an edge between a second predetermined node and a third predetermined node?" For the query permission corresponding to the graph, it is possible to set a permission not to have access to the graph and a permission to acquire actual data of nodes and edges.

According to embodiments of the present disclosure, the query open permission information may further include a permission level of the query permission opened by the federation node in the federation system. The permission level may include at least one selected from: a permission level corresponding to the node attribute, a permission level corresponding to the edge attribute, a permission level corresponding to the node label, a permission level corresponding to the edge label, a permission level corresponding to the path, or a permission level corresponding to the graph. For example, the permission level corresponding to the node attribute, the permission level corresponding to the edge attribute, the permission level corresponding to the node label, the permission level corresponding to the edge label, the permission level corresponding to the path and the permission level corresponding to the graph may increase sequentially.

According to embodiments of the present disclosure, a federation node having a query permission represented by at least one of the first query result and the first information to be queried may be determined from the at least one federation node according to the query open permission information, so as to obtain the at least one federation node to be queried.

According to embodiments of the present disclosure, each of the first information to be queried and the second information to be queried may include at least one selected from an information to be queried regarding an existence or an information to be queried regarding a number-of-times.

According to embodiments of the present disclosure, the information to be queried regarding an existence category may refer to an information for determining whether a first target information exists. The first target information may include at least one selected from a first transaction information or a relationship information. The information to be queried regarding an existence may include at least one selected from an information to be queried regarding an existence of transaction or an information to be queried regarding an existence of relationship. The information to be queried regarding a number-of-times may refer to an information for determining a number of occurrences of a second target information within a third predetermined time period. The second target information may include at least one selected from a second transaction information or a transaction object.

For example, each of the first transaction information and the second transaction information may be a transaction information R. The transaction information R may be "a transfer of XX yuan from a transaction object H to a transaction object K". The information to be queried regarding an existence of transaction may be "Is there a transaction information R?" The information to be queried regarding the number of transactions may be "The number of occurrences of transaction information R within the third predetermined time period". A relationship information T may be "A transaction object U and a transaction object V have a kinship". The information to be queried regarding an existence of relationship may be "Is there a relationship information T?"

According to embodiments of the present disclosure, the first query result and the second query result may be used by an initial federation node to generate a decision result for an initial information to be queried.

According to embodiments of the present disclosure, the initial federation node may refer to a federation node that initiates a query request for the initial information to be queried. The current federation node may be the initial federation node or not. If it is determined that the current federation node is the initial federation node, the first information to be queried may be the initial information to be queried. If it is determined that the current federation node is not the initial federation node, at least one federation node to be queried may exist between the current federation node and the initial federation node. At least one federation node to be queried may exist between the current federation node and an end federation node. The end federation node may be a last-level federation node for processing the initial information to be queried. The current federation node is not the end federation node, and the current federation node may perform the above operations S210 to S240. The federation nodes in response to the initial information to be queried may include the initial federation node and the at least one federation node to be queried. The initial federation node and the at least one federation node to be queried may form a node chain. The initial federation node and the at least one federation node to be queried may be federation nodes of at least two levels.

According to embodiments of the present disclosure, in a case that the at least one node to be queried includes a node which is not the end federation node, the current federation node may determine the first information to be queried in response to receiving the first query request. The information associated with the first information to be queried may be queried from the current graph database to obtain the first query result. The at least one federation node to be queried may be determined according to at least one of the first query result and the first information to be queried. The second query request respectively corresponding to the at least one federation node to be queried may be sent to the at least one federation node to be queried, so that the at least one federation node to be queried may query, in response to receiving the second query request, an information associated with the second information to be queried contained in the second query request from the graph database corresponding to the at least one federation node to be queried, so as to obtain at least one second query result.

According to embodiments of the present disclosure, the at least one federation node to be queried is determined as a new current federation node. A new first information to be queried is determined according to the second query result. For each new current federation node in the at least one new current federation node, if it is determined that the new current federation node is not an end federation node, an operation of querying an information associated with the new first information to be queried from a new current graph database is repeatedly performed to obtain a new first query result. At least one new federation node to be queried may be determined according to at least one of the new first query result and the new first information to be queried. A new second query request respectively corresponding to the at least one new federation node to be queried may be sent to the at least one new federation node to be queried, so that the at least one new federation node to be queried queries, in response to receiving the new second query request, an information associated with the second information to be queried contained in the new second query request from the graph database corresponding to the at least one new federation node to be queried, so as to obtain at least one new second query result, until it is determined that a new current federation node is the end federation node.

According to embodiments of the present disclosure, a federation node may send a query result to a federation node at an upper level that sends a query request in sequence. The initial federation node may determine a target query result according to the query result received from a federation node at a lower level of the initial federation node. A decision result may be determined according to the target query result. The decision result may include risky or not risky.

According to embodiments of the present disclosure, a cross-domain information query may be completed without disclosing private data of each federation node in an entire query process. Therefore, a federation system-based information processing solution may play an auxiliary role in decision-making, that is, an existence may be determined efficiently, so that an operating efficiency of the system may be improved.

Referring to FIG. 3, the method of processing the information according to embodiments of the present disclosure will be further described in conjunction with specific embodiments.

Figure 3A:
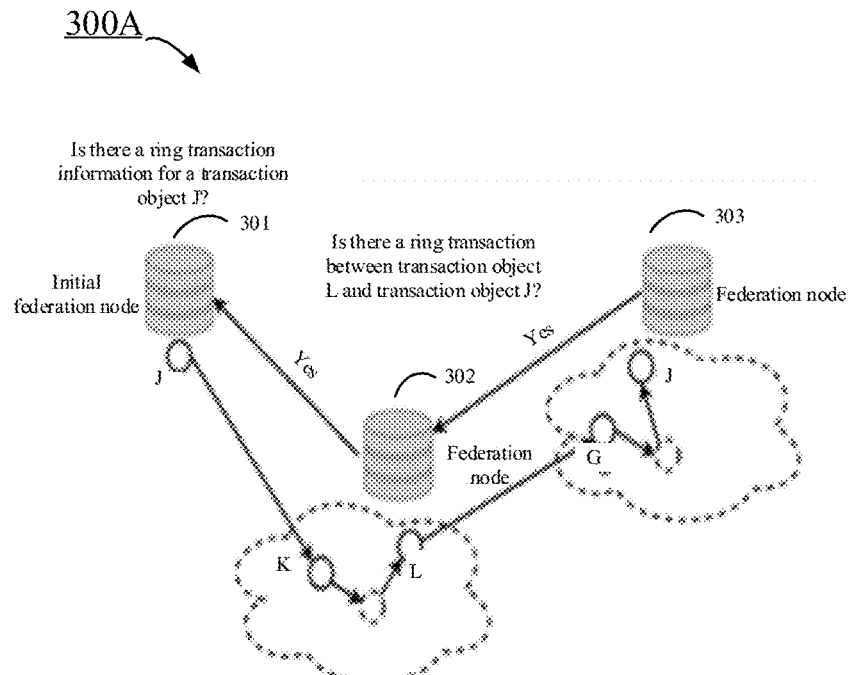
FIG. 3A schematically shows an example schematic diagram of a ring transaction query process according to embodiments of the present disclosure.

FIG. 3A schematically shows an example schematic diagram of a ring transaction query process according to embodiments of the present disclosure.

As shown in FIG. 3A, in 300A, in response to receiving a first query request, an initial federation node 301 parses the first query request to obtain an initial information to be queried. The initial information to be queried is "is there a ring transaction information for a transaction object J?" The initial federation node queries an information associated with the initial information to be queried from a current graph database, so as to obtain a first query result. The first query result is "there is an inter-bank transaction between the transaction object J and a transaction object K, and the transaction object K is at a federation node 302". The federation node 302 is a federation node to be queried.

The initial federation node 301 determines the federation node as the federation node to be queried according to the first query result. The initial federation node 301 determines a second information to be queried according to the first query result. A second query request is generated according to the second information to be queried. The second information to be queried is "Is there an inter-bank transaction from the transaction object K to the transaction object J?" A federation node 302 determines an information associated with the second information to be queried from a graph database corresponding to the federation node 302, so as to obtain a second query result. The second query result is "There is no inter-bank transaction between the transaction object K and the transaction object J, there is a transaction between the transaction object K and a transaction object L and an inter-bank transaction between the transaction object L and a transaction object G, and the transaction object G is at a federation node 303".

The federation node 303 is determined as a new current federation node, and a new first information to be queried is determined according to the second query result. The new first information to be queried is "Is there an inter-bank transaction between the transaction object G and the transaction object J?" The federation node 303 queries an information associated with the new first information to be queried from the new current graph database, so as to obtain a new first query result. The new first query result is "Is there an inter-bank transaction between the transaction object G and the transaction object J?" The federation node 303 is an end federation node. The federation node 303 sends a query result of "There is a ring transaction between the transaction object L to the transaction object J" to the federation node 302. The federation node 302 sends a query result of "There is a ring transaction for the transaction object J" to the initial federation node 301.

The initial federation node 301 may determine, according to "There is a ring transaction for the transaction object J", that a decision result for the initial information to be queried is "The transaction object J is risky".

In the 300A described above, a query of "Is there a ring transaction for transaction object J" may be completed without disclosing private data of each federation node in an entire query process. Therefore, a federation system-based information processing solution may play an auxiliary role in decision-making, that is, an existence may be determined efficiently, so that an operating efficiency of the system may be improved.

Figure 3B:
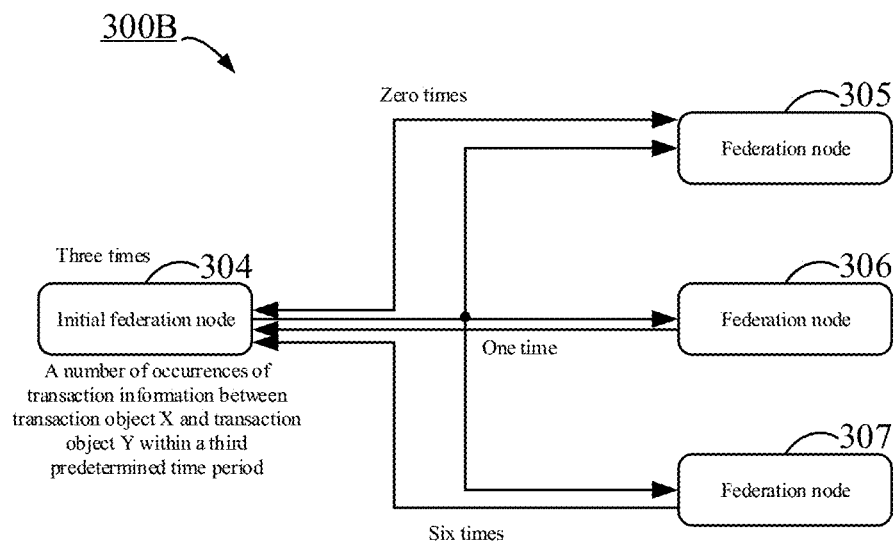
FIG. 3B schematically shows an example schematic diagram of a non-ring transaction query process according to embodiments of the present disclosure.

FIG. 3B schematically shows an example schematic diagram of a non-ring transaction query process according to embodiments of the present disclosure.

As shown in FIG. 3B, in 300B, in response to receiving a first query request, an initial federation node 304 parses the first query request to obtain an initial information to be queried. The initial information to be queried is "a number of occurrences of transaction information between transaction object X and transaction object Y within a third predetermined time period". The initial federation node queries an information associated with the initial information to be queried from a current graph database, so as to obtain a first query result. The first query result is "a number of occurrences of transaction information between transaction object X and transaction object Y within a third predetermined time period is 3". The initial federation node 304 determines, according to the initial information to be queried, that a federation node 305, a federation node 306 and a federation node 307 are all federation nodes to be queried.

The initial federation node 304 sends a second query request to the federation node 305, the federation node 306 and the federation node 307. The second query request contains a second information to be queried. The second information to be queried is "a number of occurrences of transaction information between transaction object X and transaction object Y within the third predetermined time period". The federation node 305 queries an information associated with the second information to be queried from the graph database corresponding to the federation node 305, so as to obtain a second query result corresponding to the federation node 305. The second query result corresponding to the federation node 305 is "a number of occurrences of transaction information between transaction object X and transaction object Y within the third predetermined time period is 0". The second query result corresponding to the federation node 306 and the second query result corresponding to the federation node 307 may be obtained in a same manner as the above-mentioned federation node 305 determines the second query result. The second query result corresponding to the federation node 306 is "a number of occurrences of transaction information between transaction object X and transaction object Y within the third predetermined time period is 1", and the second query result corresponding to the federation node 307 is "a number of occurrences of transaction information between transaction object X and transaction object Y within the third predetermined time period is 6".

The federation node 305, the federation node 306 and the federation node 307 respectively send corresponding second query results to the initial federation node 304.

According to the first query result and the three second query results, the initial federation node 304 may determine that the target query result is "a number of occurrences of transaction information between transaction object X and transaction object Y within the third predetermined time period is 10". A predetermined number-of-occurrences threshold is 5. The initial federation node 315 determines that 10 is greater than 5. Therefore, the initial federation node 304 determines that the decision result for the initial information to be queried is "the transaction between transaction object X and transaction object Y is risky".

In the 300B described above, a query of "a number of occurrences of transaction information between transaction object X and transaction object Y within the third predetermined time period" may be completed without disclosing private data of each federation node in an entire query process. Therefore, a federation system-based information processing solution may play an auxiliary role in decision-making, that is, an existence may be determined efficiently, so that an operating efficiency of the system may be improved.

According to embodiments of the present disclosure, in a case that the current federation node is a non-current leader federation node, the method of processing the information may further include the following operations.

In response to a detection of a data change request, a version identification acquisition request is sent to a current leader federation node. In response to a data version identification being received from the current leader federation node, the data version identification and current changed data are stored in an association manner in the current graph database.

According to embodiments of the present disclosure, a leader federation node may be used to generate a data version identification. The data version identification generated by the leader federation node may be used by the federation node to apply for the data version identification from the leader federation node when it is needed to perform a data change on the graph database.

According to embodiments of the present disclosure, a data change request may refer to a request for changing data in a graph database of a federation node. The version identification acquisition request may refer to a request for acquiring the data version identification.

According to embodiments of the present disclosure, in a case of performing an information query operation, the generated query request may include the data version identification, so that data within a time period corresponding to the data version identification may be obtained according to the data version identification. The information processing solution of embodiments of the present disclosure may implement an information query as follows.

One method is Query Fresh Version, that is, to acquire data corresponding to a fresh data version identification.

Another method is Query Complete Version, that is, to acquire data corresponding to a public data version identification in all graph databases. The public version data identification may refer to a data version identification that exists in all graph databases.

Another method is Query FIX Version, that is, to acquire data corresponding to a fix data version identification.

According to embodiments of the present disclosure, the current federation node is not a current leader federation node.

According to embodiments of the present disclosure, the method of processing the information may further include the following operations.

In response to a data deletion request being received from the current leader federation node, a version identification of data to be deleted is determined. Data corresponding to the version identification of data to be deleted is deleted from the current graph database according to the version identification of data to be deleted.

According to embodiments of the present disclosure, in a case that the current federation node is a current leader federation node, the method of processing the information may further include the following operations.

A registration information is determined in response to a registration request being received from a node to be registered. If it is determined that a registration condition is met, the node to be registered is determined as a newly added federation node. A current system meta information is updated according to the registration information, so as to obtain a new first current system meta information.

According to embodiments of the present disclosure, the leader federation node may be used to participate in an operation of requesting to join the federation system by the node to be registered.

According to embodiments of the present disclosure, the registration information may include at least one selected from: a node identification of the node to be registered, a data size, a data update frequency, a data update time, a data freshness information, a node resource size, a query open permission information, or a registration node role. The data freshness information may be determined according to the data update time. The registered node role may include a node role with a proposal permission and a node role without a proposal permission. The registration condition may be used as one basis for determining whether a node to be registered may be a newly added node of the federation system. The current system meta information may include at least one selected from: a federation node identification, a federation node weight information, a data model, or a query open permission information.

According to embodiments of the present disclosure, when it is determined that the registration condition is met, the current leader federation node may determine the node to be registered as a newly added federation node. The current system meta information may be updated according to the registration information to obtain a new first current system meta information. For example, a node weight information of the node to be registered may be determined according to at least one selected from the data size, the data update frequency, the data update time, the data freshness information, or the node resource size. The current system meta information may be updated according to at least one selected from the node identification of the node to be registered, the node weight information, or the query open permission information, so as to obtain the first current system meta information. When it is determined that the registration condition is not met, it may be determined that the node to be registered may not become a federation node of the federation system.

According to embodiments of the present disclosure, the method of processing the information may further include the following operations.

The new first current system meta information is sent to the newly added federation node, so that the newly added federation node creates a graph database corresponding to the newly added federation node by using the new first current system meta information. The new current system meta information is sent to at least one first other federation node, so that the at least one first other federation node updates a graph database corresponding to the first other federation node by using the new first current system meta information.

According to embodiments of the present disclosure, the current leader federation node may send the new first current system meta information to the newly added federation node and the at least one first other federation node in the federation system. The at least one first other federation node may be all or part of federation nodes in the federation system. The newly added federation node may create a graph database corresponding to the newly added federation node by using the new first current system meta information. A data model in the graph database corresponding to the newly added federation node is consistent with a data model in the first current system meta information.

According to embodiments of the present disclosure, an initial creator may create a graph database according to a service scenario. The initial creator may act as a current leader federation node of the federation system. The current leader federation node may publish the graph database so that other nodes may apply to join the federation system. The current leader federation node is not fixed, but may be rotated according to a predetermined rotation strategy.

According to embodiments of the present disclosure, the graph database of the initial creator may be published via a data publishing server. The data publishing server may include a private publishing server and a public publishing server. The private publishing server may be viewed after a certificate is acquired, and it is possible to join the public server after a registration and an authentication.

According to embodiments of the present disclosure, in a case that the current federation node is a node in a weak federation system, determining the node to be registered as a newly added federation node in response to a determination that the registration condition is met may include the following operations.

A first feedback result is determined according to the registration information. The registration information is sent to at least one first other federation node, so that the at least one first other federation node determines at least one second feedback result according to the registration information. In response to the at least one second feedback result being received, a first overall feedback result is determined according to the first feedback result and the at least one second feedback result. If it is determined that the first overall feedback result meets the registration condition, the node to be registered may be determined as a newly added federation node of the weak federation system.

According to embodiments of the present disclosure, the first feedback result and the second feedback result may indicate whether the node to be registered is approved as a federation node of the federation system.

According to embodiments of the present disclosure, in a case that the current leader federation node is a leader federation node in a weak federation system, the current leader federation node determining the first overall feedback result according to the first feedback result and the at least one second feedback result may include determining a first number. The first number may be a number of query results of approving the federation node to be registered as a federation node in the federation system among the first feedback result and the at least one second feedback result. If it is determined that the first number is greater than or equal to a first predetermined number threshold, a first overall feedback result of approving the node to be registered as a federation node of the federation system is determined. If it is determined that the first number is less than the first predetermined number threshold, a first overall feedback result of not approving the node to be registered as a federation node of the federation system is determined. The first predetermined number threshold may be determined according to the number of federation nodes included in the federation system. Alternatively, if it is determined that the first number is greater than the first predetermined number threshold, a first overall feedback result of approving the node to be registered as a federation node of the federation system is determined. If it is determined that the first number is less than the first predetermined number threshold, a first overall feedback result of not approving the node to be registered as a federation node of the federation system is determined. If it is determined that the first number is equal to the first predetermined number threshold, whether to approve the node to be registered as a federation node of the federation system may be determined according to the first feedback result of the current leader federation node. For example, if it is determined that the first feedback result is to approve the node to be registered as a federation node of the federation system, it is determined that the node to be registered is approved as a federation node of the federation system. If it is determined that the first feedback result is not to approve the node to be registered as a federation node of the federation system, it is determined not to approve the node to be registered as a federation node of the federation system.

According to embodiments of the present disclosure, the current leader federation node determining the first overall feedback result according to the first feedback result and the at least one second feedback result may include: the current leader federation node may determine the first overall feedback result according to the first feedback result of the current leader federation node, the federation node weight information of the current leader federation node, the second feedback result of the at least one first other federation node, and the federation node weight information of the at least one first other federation node. For example, the current leader federation node may determine a first weighted feedback result according to the first feedback result of the current leader federation node and the federation node weight information of the current leader federation node. The current leader federation node may determine a second weighted feedback result respectively corresponding to the at least one first other federation node according to the second feedback result respectively corresponding to the at least one first other federation node and the federation node weight information respectively corresponding to the at least one first other federation node. The current leader federation node may determine the first overall feedback result according to the first weighted feedback result and the at least one second weighted feedback result. If it is determined that a value indicated by the first overall feedback result is greater than or equal to a second predetermined threshold, a first overall feedback result of agreeing the node to be registered as a federation node of the federation system is determined. If it is determined that the value indicated by the first overall feedback result is less than the second predetermined threshold, a first overall feedback result of not approving the node to be registered as a federation node of the federation system is determined. The second predetermined threshold may be determined according to the number of federation nodes included in the federation system.

According to embodiments of the present disclosure, the node to be registered may act as a federation node without proposal permission and voting permission. Subsequently, it is possible to initiate an application of becoming a federation node with proposal permission and voting permission according to a contribution to at least one selected from a data size and a node resource. In addition, the node to be registered may apply to become a federation node with proposal permission and voting permission when applying to become a federation node of the federation system. A purpose of designing different node roles is to determine a node weight information according to the contribution in an adaptive network, so as to avoid an excessive participation of federation nodes with proposal permission and voting permission in tasks such as evaluation.

According to embodiments of the present disclosure, in a case that the current federation node is a node in a strong federation system, determining the node to be registered as a newly added federation node in response to a determination that the registration condition being met may include the following operations.

The first feedback result is determined according to the registration information. If it is determined that the first feedback result meets the registration condition, the node to be registered is determined as a newly added federation node of the strong federation system.

According to embodiments of the present disclosure, the current leader federation node may be a leader federation node in the strong federation system. The first feedback result may indicate whether the node to be registered is approved as a federation node of the federation system.

According to embodiments of the present disclosure, when it is determined that the first feedback result is to approve the node to be registered as a federation node of the federation system, the current leader federation node may determine that the registration condition is met. When it is determined that the first feedback result is not to approve the node to be registered as a federation node of the federation system, the current leader federation node may determine that the registration condition is not met. The current leader federation node in the strong federation system may determine the node role of the newly added federation node.

According to embodiments of the present disclosure, the current system meta information may include at least one selected from: a federation node identification, a federation node weight information, a data model, or a query open permission information.

According to embodiments of the present disclosure, the federation node identification may be used to represent a federation node. The federation node identification may include a federation node address. The federation node weight information may be used to represent a node weight of the federation node. The federation node weight information of the federation node may be determined according to at least one selected from a data size, a data update frequency, a data update time, a data freshness information or a node resource size of the federation node. For example, the larger the data size, the higher the data update frequency, the newer the data update time, the fresher the data and the larger the node resource size, the greater the federation node weight. The smaller the data size, the lower the data update frequency, the older the data update time, the older the data and the smaller the node resource size, the less the federation node weight.

According to embodiments of the present disclosure, the query open permission information may include an information for which a federation node in the federation system has opened a query permission. The information for which the query permission is opened may include at least one selected from: a node attribute, an edge attribute, a node label, an edge label, a path, or a graph. The query permission may include a "yes or no" permission. For other descriptions of the query open permission information, reference may be made to the relevant part above, which will not be described in detail here.

According to embodiments of the present disclosure, a data model (that is, Schema) may refer to a description of data. The data model may be used to describe the node label and the node attribute of the node, and the edge label and the edge attribute of the edge. The data model may include a public domain data model and a private domain data model. The public domain data model may refer to a data model that the federation nodes of the federation system achieve a consensus on. The private domain data model may refer to a data model that follows a same data rule as the public domain data model and that the federation nodes of the federation system do not achieve a consensus on.

According to embodiments of the present disclosure, the public domain data model and the private domain data model may be used to implement a localization of algorithms and queries. For example, some localized algorithms need to rely on a localized feature, but the localized feature is not a global feature. Then a private domain data model may be created for the localized feature. For example, in an event of a crisis in an enterprise, it is needed to acquire upstream and downstream relationships of the enterprise on a local capital account, so as to avoid a chain reaction as far as possible. In this case, a private domain data model may be created for the above-mentioned data.

Figure 4:
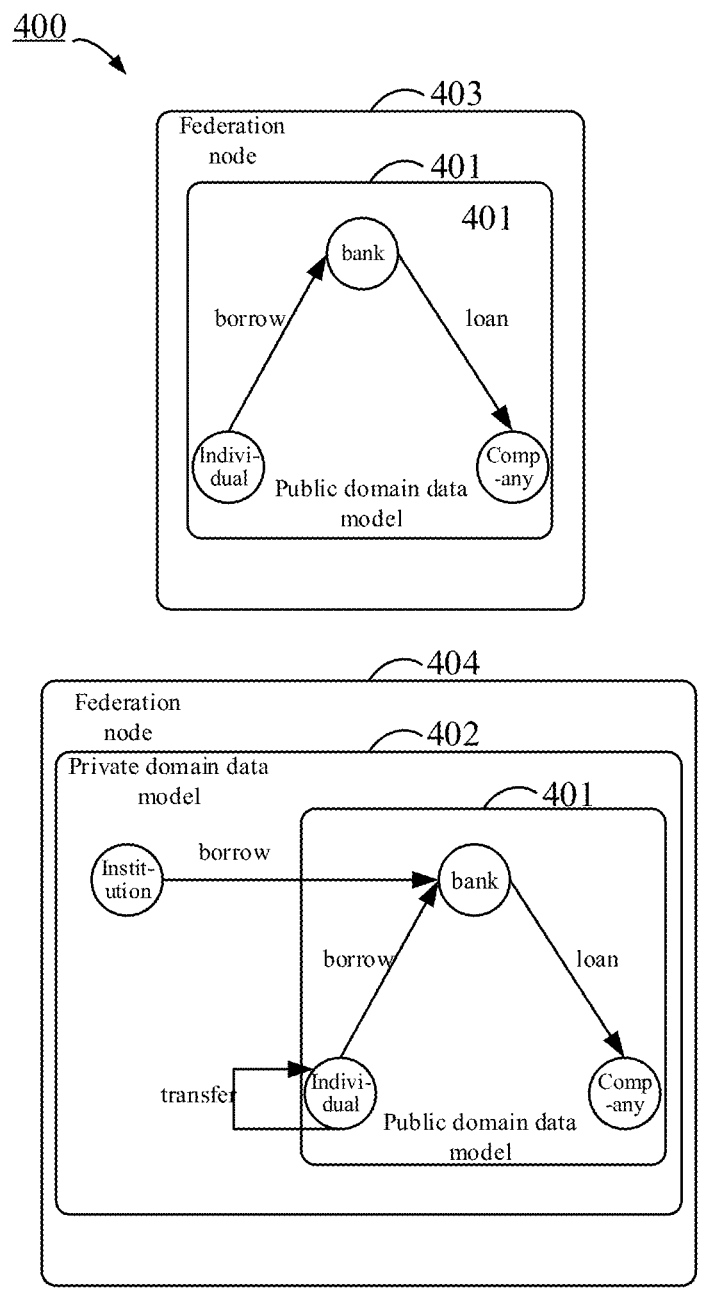
FIG. 4 schematically shows an example schematic diagram of a data model according to embodiments of the present disclosure.

FIG. 4 schematically shows an example schematic diagram of a data model according to embodiments of the present disclosure.

As shown in FIG. 4, a public domain data model 401 and a private domain data model 402 may be included in 400. The public domain data model 401 is used to describe a borrow relationship between an individual and a bank, and a loan relationship between a bank and a company. In the private domain data model 402, a content for describing a borrow relationship between an institution and a bank and a transfer relationship between individuals is added based on the public domain data model 401.

The data model of the graph database corresponding to a federation node 403 includes the public domain data model 401. The graph database corresponding to a federation node 404 includes the public domain data model 401 and the private domain data model 402.

According to embodiments of the present disclosure, in a case that the current federation node is the current leader federation node, the method of processing the information may further include the following operations.

A plan to be executed is determined in response to a proposal request being received from a proposal federation node. If it is determined that the plan to be executed is passed, a proposal execution request for the plan to be executed is generated. In response to the proposal execution request being received, the plan to be executed is executed to obtain a first execution result. The proposal execution request is sent to at least one second other federation node, so that the at least one second other federation node executes the plan to be executed in response to receiving the proposal execution request, so as to obtain at least one second execution result. In response to the at least one second execution result being received, an execution completion result is determined according to the first execution result and the at least one second execution result. If it is determined that the execution completion result is an execution success, an execution operation for the plan to be executed is completed.

According to embodiments of the present disclosure, the current leader federation node may parse a proposal request to obtain the plan to be executed. The plan to be executed may be voted on after being audited by an actual offline person in charge. If it is determined that the plan to be executed is passed, a proposal execution request may be generated. The current leader federation node may send the proposal execution request to the at least one second other federation node in the federation system. The at least one second other federation node in the federation system may include all or part of federation nodes in the federation system except the current leader federation node.

According to embodiments of the present disclosure, the current leader federation node may execute the plan to be executed, so as to obtain a first execution result. Each second other federation node in the at least one second other federation node may execute the plan to be executed to obtain a second execution result. Each of the first execution result and the second execution result may include an execution success or an execution failure. Executing the plan to be executed may include: executing the plan to be executed based on a pre-writing strategy, a committing strategy and a rollback strategy. Pre-writing may refer to that the execution has been written to disk but has not taken effect at a system level. Committing may refer to switching pre-writing to take effect. Rollback may refer to a deletion of pre-written content. The rollback may not be performed after committing. The proposal may fail if a failure occurs in a pre-writing stage, and if the pre-writing has been completed, the current leader federation node may send a rollback instruction. If a failure occurs in a committing stage, it is needed to continue committing after the federation node recovers.

According to embodiments of the present disclosure, the current leader federation node may determine the execution completion result according to the first execution result and the at least one second execution result. For example, if it is determined that the first execution result is an execution success and the at least one second execution result is an execution success, the current leader federation node may determine that the execution completion result is an execution success.

According to embodiments of the present disclosure, a plurality of plans to be executed may be executed serially.

According to embodiments of the present disclosure, a type of the plan to be executed may include at least one selected from: a data model change type, a federation node exit type, a query open permission information change type, or a federation node weight information change type.

According to embodiments of the present disclosure, the data model change type may include at least one selected from: adding a node label, adding an edge label, adding a node attribute, adding an edge attribute, deleting a node label, deleting an edge label, deleting a node attribute, or deleting an edge attribute. The data model change needs to follow a downward compatibility strategy. For example, a change to an attribute type is not allowed. For example, integer data is changed to floating point data.

According to embodiments of the present disclosure, for example, the query open permission information change type may include at least one selected from: adding a query permission for a predetermined node attribute, canceling a query permission for a predetermined node attribute, adding a query permission for a predetermined node label, or canceling a query permission for a predetermined node label.

According to embodiments of the present disclosure, the federation node weight information change type may include one selected from: increasing a federation node weight information of a federation node or decreasing a federation node weight information of a federation node. Decreasing the federation node weight information of the federation node may include adjusting a federation node with proposal permission to a federation node without proposal permission. Increasing the federation node weight information of the federation node may include adjusting a federation node without proposal permission to a federation node with proposal permission.

According to embodiments of the present disclosure, the current system meta information includes a federation node weight information. A type of the plan to be executed includes the federation node weight information change type.

According to embodiments of the present disclosure, in a case that the current federation node is a node in a weak federation system, the method of processing the information may further include the following operations.

A third feedback result for the plan to be executed is determined. The plan to be executed is sent to at least one second other federation node of the weak federation system, so that the at least one second other federation node determines at least one fourth feedback result according to the plan to be executed. In response to the at least one fourth feedback result being received, a second overall feedback result is determined according to the third feedback result and the at least one fourth feedback result. According to the second overall feedback result, it is determined whether the plan to be executed is passed or not passed.

According to embodiments of the present disclosure, the type of the plan to be executed includes the federation node weight information change type, that is, the plan to be executed may be a node weight change plan. The node weight change plan may be used to adjust the federation node weight information of the federation node. The node weight change plan contains a target federation node that needs to change the federation node weight information. The node weight change plan may include increasing the federation node weight information of the target federation node or decreasing the federation node weight information of the target federation node. Decreasing the federation node weight information of the target federation node may include adjusting the target federation node with proposal permission to a target federation node without proposal permission. Increasing the federation node weight information of the target federation node may include adjusting the target federation node without proposal permission to a target federation node with proposal permission.

According to embodiments of the present disclosure, the third feedback result and the fourth feedback result may indicate whether it is approved to pass the node weight change plan.

According to embodiments of the present disclosure, it may be determined that a proposal request for a node weight change plan needs to be submitted, in response a detection of at least one selected from: a data update ratio of the target federation node within a fourth predetermined time period is less than or equal to a predetermined ratio threshold, a data size of the target federation node is less than or equal to a predetermined size threshold, or a computing resource amount of the target federation node is less than or equal to a predetermined resource threshold.

According to embodiments of the present disclosure, the current leader federation node determining the second overall feedback result according to the third feedback result and the at least one fourth feedback result may include determining a second number. The second number may indicate a number of query results of approving of passing the node weight change plan among the third feedback result and the at least one fourth feedback result. If it is determined that the second number is greater than or equal to a second predetermined number threshold, a second overall feedback result of approving of passing the node weight change plan is determined. If it is determined that the second number is less than the second predetermined number threshold, a second overall feedback result of not approving of passing the node weight change plan is determined. The second predetermined number threshold may be determined according to the number of federation nodes included in the federation system. Alternatively, if it is determined that the second number is greater than the second predetermined number threshold, the second overall feedback result of approving of passing the node weight change plan is determined. If it is determined that the second number is less than the second predetermined number threshold, the second overall feedback result of not approving of passing the node weight change plan is determined. If it is determined that the second number is equal to the second predetermined number threshold, whether to approve of passing the node weight change plan may be determined according to the third feedback result of the current leader federation node. For example, if it is determined that the third feedback result is an approval of passing the node weight change plan, it is determined to approve of passing the node weight change plan. If it is determined that the third feedback result is a non-approval of passing the node weight change plan, it is determined not to approve of passing the node weight change plan.

According to embodiments of the present disclosure, the current leader federation node determining the second overall feedback result according to the third feedback result and the at least one fourth feedback result may include: the current leader federation node may determine the second overall feedback result according to the third feedback result of the current leader federation node, the federation node weight information of the current leader federation node, the respective fourth feedback result of the at least one second other federation node, and the respective federation node weight information of the at least one second other federation node. For example, the current leader federation node may determine a third weighted feedback result according to the third feedback result of the current leader federation node and the federation node weight information of the current leader federation node. The current leader federation node may determine a fourth weighted feedback result respectively corresponding to the at least one second other federation node according to the fourth feedback result respectively corresponding to the at least one second other federation node and the federation node weight information respectively corresponding to the at least one second other federation node. The current leader federation node may determine the second overall feedback result according to the third weighted feedback result and the at least one fourth weighted feedback result. If it is determined that a value indicated by the second overall feedback result is greater than or equal to the second predetermined threshold, the second overall feedback result of approving of passing the node weight change plan is determined. If it is determined that the value indicated by the second overall feedback result is less than the second predetermined threshold, the second overall feedback result of not approving of passing the node weight change plan is determined. The second predetermined threshold may be determined according to the number of federation nodes included in the federation system.

According to embodiments of the present disclosure, if it is determined that the value indicated by the second overall feedback result is greater than or equal to a third predetermined threshold, the second overall feedback result of approving of passing the node weight change plan is determined. If it is determined that the value indicated by the second overall feedback result is greater than or equal to a fourth predetermined threshold and less than the third predetermined threshold and that a timeout non-voting condition is met, the second overall feedback result of approving of passing the node weight change plan is determined. If it is determined that the value indicated by the second overall feedback result is less than the fourth predetermined threshold, the second overall feedback result of not approving of passing the node weight change plan is determined. The third predetermined threshold and the fourth predetermined threshold may be determined according to the number of federation nodes included in the federation system. For example, the third predetermined threshold may be 50%, and the fourth predetermined threshold may be 30%.

According to embodiments of the present disclosure, the second overall feedback result of approving of passing the node weight change plan being determined if it is determined that the value indicated by the second overall feedback result is greater than or equal to a fourth predetermined threshold and less than the third predetermined threshold and that a timeout non-voting condition is met may include: the second overall feedback result of approving of passing the node weight change plan is determined if it is determined that a fourth weighted feedback result is greater than or equal to the fourth predetermined threshold and the other fourth weighted feedback results are zero.

According to embodiments of the present disclosure, the federation node weight information is introduced into the operation of determining whether to pass the plan to be executed, and a federation node with a larger data size has a larger federation node weight, so that rights and interests of the federation node with a larger data size may be ensured effectively.

According to embodiments of the present disclosure, the current system meta information includes the federation node weight information. The type of the plan to be executed includes the federation node weight information change type.

According to embodiments of the present disclosure, in a case that the current federation node is a node in a strong federation system, the method of processing the information may further include the following operations.

A third feedback result for the plan to be executed is determined. Whether to pass the plan to be executed or not is determined according to the third feedback result.

According to embodiments of the present disclosure, the current leader federation node may be a leader federation node in a strong federation system. The third feedback result may indicate whether it is approved to pass the node weight change plan, that is, the third feedback result may indicate that the node weight change plan is passed or not passed.

According to embodiments of the present disclosure, the current federation leader node may determine to pass the node weight change plan if it is determined that the third feedback result is that the node weight change plan is passed. The current leader federation node may determine not to pass the node weight change plan if it is determined that the third feedback result is that the node weight change plan is not passed.

According to embodiments of the present disclosure, the type of the plan to be executed includes a federation node exit type.

According to embodiments of the present disclosure, in a case that the current federation node is a node in a weak federation system, the method of processing the information may further include the following operations.

A fifth feedback result for the plan to be executed is determined. The plan to be executed is sent to at least one second other federation node of the weak federation system, so that the at least one second other federation node determines at least one sixth feedback result in response to receiving the plan to be executed. In response to the at least one sixth feedback result being received, a third overall feedback result is determined according to the fifth feedback result and the at least one sixth feedback result. According to the third overall feedback result, it is determined whether the plan to be executed is passed or not passed.

According to embodiments of the present disclosure, the type of the plan to be executed includes a federation node exit type, that is, the plan to be executed may be a node exit plan. The node exit plan may contain a federation node to be exited. The fifth feedback result and the sixth feedback result may indicate whether the federation node to be exited is approved to exit from the federation system.

According to embodiments of the present disclosure, when it is detected that a federation node to be exited does not participate in voting within a fifth predetermined time period, it may be determined that a proposal request for a node exit plan needs to be proposed.

According to embodiments of the present disclosure, the current leader federation node determining the third overall feedback result according to the fifth feedback result and the at least one sixth feedback result may include determining a third number. The third number may indicate a number of query results of approving of passing the node exit plan among the fifth feedback result and the at least one sixth feedback result. If it is determined that the third number is greater than or equal to the third predetermined number threshold, a third overall feedback result of approving of passing the node exit plan is determined. If it is determined that the third number is less than the third predetermined number threshold, a third overall feedback result of not approving of passing the node exit plan is determined. The third predetermined number threshold may be determined according to the number of federation nodes included in the federation system. Alternatively, if it is determined that the third number is greater than the third predetermined number threshold, the third overall feedback result of approving of passing the node exit plan is determined. If it is determined that the third number is less than the third predetermined number threshold, the third overall feedback result of not approving of passing the node exit plan is determined. If it is determined that the third number is equal to the third predetermined number threshold, whether to approve of passing the node exit plan may be determined according to the fifth feedback result of the current leader federation node. For example, if it is determined that the fifth feedback result is that the node exit plan is approved, it is determined to approve of passing the node exit plan. If it is determined that the fifth feedback result is that the node exit plan is not approved, it is determined not to approve of passing the node exit plan.

According to embodiments of the present disclosure, the current leader federation node determining the third overall feedback result according to the fifth feedback result and the at least one sixth feedback result may include: the current leader federation node may determine the third overall feedback result according to the fifth feedback result of the current leader federation node, the federation node weight information of the current leader federation node, the respective sixth feedback result of the at least one second other federation node, and the respective federation node weight information of the at least one second other federation node. For example, the current leader federation node may determine a fifth weighted feedback result according to the fifth feedback result of the current leader federation node and the federation node weight information of the current leader federation node. The current leader federation node may determine a sixth weighted feedback result respectively corresponding to the at least one second other federation node according to the sixth feedback result respectively corresponding to the at least one second other federation node and the federation node weight information respectively corresponding to the at least one second other federation node. The current leader federation node may determine the third overall feedback result according to the fourth weighted feedback result and the at least one sixth weighted feedback result. If it is determined that a value indicated by the third overall feedback result is greater than or equal to a fifth predetermined threshold, the third overall feedback result of approving of passing the node exit plan is determined. If it is determined that the value indicated by the third overall feedback result is less than the fifth predetermined threshold, the third overall feedback result of not approving of passing the node exit plan is determined. The fifth predetermined threshold may be determined according to the number of federation nodes included in the federation system.

According to embodiments of the present disclosure, the type of the plan to be executed includes a federation node exit type.

According to embodiments of the present disclosure, in a case that the current federation node is a node in a strong federation system, the method of processing the information may further include the following operations.

A fifth feedback result for the plan to be executed is determined. Whether the plan to be executed is passed or not passed is determined according to the fifth feedback result.

According to embodiments of the present disclosure, the current leader federation node may be a leader federation node in the strong federation system. The fifth feedback result may indicate whether the node exit plan is approved, that is, the fifth feedback result may indicate whether the node exit plan is passed or not passed.

According to embodiments of the present disclosure, if it is determined that the fifth feedback result is that the node exit plan is passed, the current leader federation node may determine to pass the node exit plan. If it is determined that the fifth feedback result is that the node exit plan is not passed, the current leader federation node may determine not to pass the node exit plan According to embodiments of the present disclosure, in a case that the current federation node is the current leader federation node, the method of processing the information may further include the following operations.

In a case that a repair of fault is detected, a communicative connection request is sent to at least one third other federation node. In response to a connection rejection information from the at least one third other federation node and a new current leader federation node identification being received, a meta information acquisition request is sent to a new current leader federation node corresponding to the new current leader federation node identification. In response to a new second current system meta information being received from the new current leader federation node, a graph database corresponding to the current leader federation node is updated using the new second current system meta information.

According to embodiments of the present disclosure, the leader federation node may have a time stamp corresponding to the leader federation node. The time stamp may be used as a basis for determining whether the leader federation node is the current leader federation node or a previous leader federation node.

According to embodiments of the present disclosure, the current leader federation node may send a first heartbeat signal to the at least one third other federation node of the federation system, so as to establish a communicative connection with the third other federation node. The first heartbeat signal may include the time stamp and the current system meta information.

According to embodiments of the present disclosure, in a case of a fault of the current leader federation node, the current leader federation node may repair the fault. When a repair of fault is detected, the current leader federation node may send a second heartbeat signal to the at least one third other federation node. The second heartbeat signal may include a time stamp and a current system meta information. The third other federation node may parse the second heartbeat signal to obtain the time stamp. In a case of determining that the time stamp is not a latest time stamp, the third other federation node may send an information of rejecting the heartbeat signal and the new current leader federation node identification to the current leader federation node. In response to receiving the information of rejecting the heartbeat signal and the new current leader federation node identification from the at least one third other federation node, the current leader federation node may send a meta information acquisition request to the new current leader federation node corresponding to the new current leader federation node identification. In response to a new second current system meta information being received from the new current leader federation node, the graph database corresponding to the current leader federation node is updated using the new second current system meta information. In addition, the current leader federation node may further update the locally stored time stamp.

According to embodiments of the present disclosure, in a case that the current federation node is a non-current leader federation node, the method of processing the information may further include the following operations.

In response to a fault of the current leader federation node being detected, a re-election request is sent to at least one fourth other federation node, so that the current federation node participates in an operation of electing a new current leader federation node. In response to an election success information being received, the current system meta information is updated to obtain a new third current system meta information. The new third current system meta information is sent to at least one fifth other federation node, so that the at least one fifth other federation node updates a graph database corresponding to the fifth other federation node by using the new third current system meta information. The election success information may indicate that the current federation node is determined to be the new current leader federation node.

According to embodiments of the present disclosure, when the current federation node detects that the current leader federation node has a fault, the current federation node may apply to become a new current leader federation node. Thus, the current federation node may send a re-election request to the at least one fourth other federation node in the federation system, so that the current federation node participates in the operation of electing a new current leader federation node. The current federation node becomes a candidate node. The current leader federation node may update the time stamp to obtain a new time stamp. It is possible to acquire an information of at least one other candidate node within a predetermined networking timeout period, and determine a target node from the candidate node and the at least one other candidate node. The target node may be determined as the new current leader federation node.

According to embodiments of the present disclosure, the current federation node may update the current system meta information to obtain the new third current system meta information, in a case that the election success information is received. The current federation node is the target node, that is, the current federation node is the new current leader federation node. The new current leader federation node may send a third heartbeat signal to the at least one fifth other federation node in the federation system. The third heartbeat signal may include the new third current system meta information and a new time stamp, so that the at least one fifth other federation node updates a graph database corresponding to the fifth other federation node using the new third current system meta information, and the at least one fifth other federation node updates the locally stored time stamp according to the new time stamp.

According to embodiments of the present disclosure, the new current leader federation node may be determined at one time with a high probability through weight and asynchronous networking timeout. If the new current leader federation node is not determined at one time, all candidate nodes may be controlled to sleep randomly for a period greater than the predetermined networking timeout period, thereby effectively ensuring that a candidate node may be determined to participate in the election.

In the technical solution of the present disclosure, an acquisition, a storage, a use, a processing, a transmission, a provision and a disclosure of user personal information involved comply with provisions of relevant laws and regulations, and do not violate public order and good custom.

The above are merely exemplary embodiments. The present disclosure is not limited thereto, and may further include other information processing methods known in the art, as long as information processing may be performed.

Figure 5:
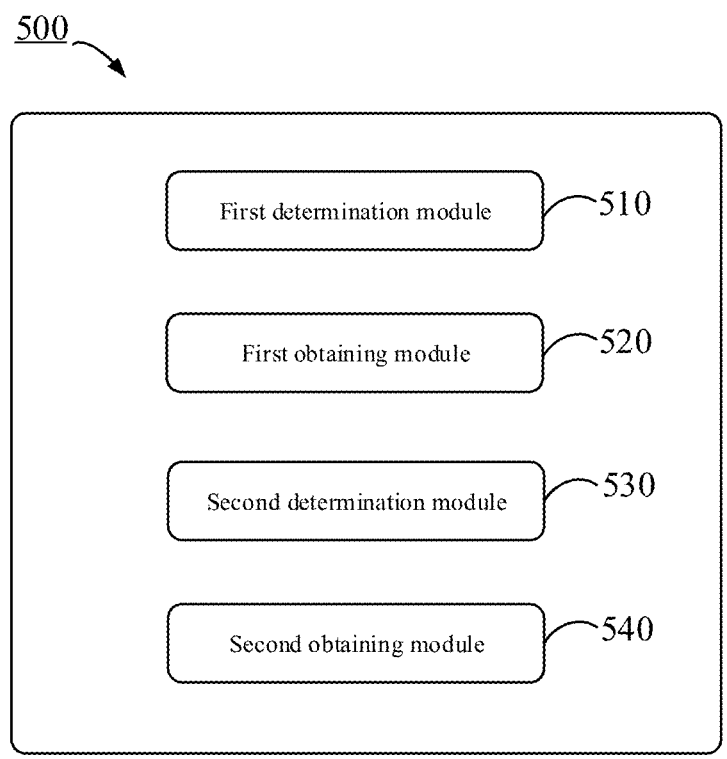
FIG. 5 schematically shows a block diagram of an apparatus of processing an information according to embodiments of the present disclosure.

FIG. 5 schematically shows a block diagram of an apparatus of processing an information according to embodiments of the present disclosure.

As shown in FIG. 5, an apparatus 500 of processing an information may include a first determination module 510, a first obtaining module 520, a second determination module 530, and a second obtaining module 540.

The first determination module 510 may be used to determine a first information to be queried, in response to receiving a first query request.

The first obtaining module 520 may be used to query an information associated with the first information to be queried from a current graph database, so as to obtain a first query result.

The second determination module 530 may be used to determine at least one federation node to be queried, according to at least one of the first query result and the first information to be queried.

The second obtaining module 540 may be used to send a second query request to the at least one federation node to be queried, so that the at least one federation node to be queried queries, in response to receiving the second query request, an information associated with a second information to be queried contained in the second query request from a graph database corresponding to the at least one federation node to be queried, so as to obtain at least one second query result.

According to embodiments of the present disclosure, the first query result and the second query result are used by an initial federation node to generate a decision result for an initial information to be queried.

According to embodiments of the present disclosure, the second determination module 530 may include a first determination sub-module.

The first determination sub-module may be used to determine the at least one federation node to be queried according to a query open permission information and at least one of the first query result and the first information to be queried.

According to embodiments of the present disclosure, the current graph database includes at least one data version identification, a plurality of node information corresponding to the data version identification and at least one edge information corresponding to the data version identification, the node information includes at least one node label of a node and at least one node attribute corresponding to the node label, the edge information includes an edge label of an edge and at least one edge attribute corresponding to the edge label, and the edge label indicates a relationship between two nodes connected by the edge.

According to embodiments of the present disclosure, the first information to be queried includes at least one selected from: a time period to be queried, a node to be queried, or an edge to be queried.

According to embodiments of the present disclosure, the first information to be queried includes the time period to be queried and the node to be queried.

According to embodiments of the present disclosure, the first obtaining module 520 may include a second determination sub-module and a first obtaining sub-module.

The second determination sub-module may be used to determine at least one target data version identification corresponding to the time period to be queried from at least one data version identification contained in the current graph database.

The first obtaining sub-module may be used to query the information associated with the node to be queried from a plurality of nodes corresponding to the at least one target data version identification, so as to obtain the first query result.

According to embodiments of the present disclosure, the first information to be queried and the second information to be queried include at least one selected from an information to be queried of an existence category and an information to be queried of a number-of-times category.

According to embodiments of the present disclosure, the current federation node is not a current leader federation node.

According to embodiments of the present disclosure, the apparatus 500 of processing the information may further include a first sending module and a storage module.

The first sending module may be used to send a version identification acquisition request to the current leader federation node in response to a data change request being received.

The storage module may be used to store a data version identification and current changed data in an association manner in the current graph database in response to the data version identification being received from the current leader federation node.

According to embodiments of the present disclosure, the current federation node is a current leader federation node.

According to embodiments of the present disclosure, the apparatus 500 of processing the information may further include a third determination module, a fourth determination module, a third obtaining module, and a second sending module.

The third determination module may be used to determine a registration information in response to a registration request being received from a node to be registered.

The fourth determination module may be used to determine the node to be registered as a newly added federation node in response to a determination that a registration condition being met.

The third obtaining module may be used to update a current system meta information according to the registration information, so as to obtain a new first current system meta information.

According to embodiments of the present disclosure, the apparatus 500 of processing the information may further include a second sending module and a third sending module.

The second sending module may be used to send the new first current system meta information to the newly added federation node, so that the newly added federation node creates a graph database corresponding to the newly added federation node by using the new first current system meta information.

The third sending module may be used to send the new first current system meta information to at least one first other federation node, so that the at least one first other federation node updates a graph database corresponding to the first other federation node by using the new first current system meta information.

According to embodiments of the present disclosure, in a case that the current federation node is a node in a weak federation system, the fourth determination module may include a third determination sub-module, a first sending sub-module, a fourth determination sub-module, and a fifth determination sub-module.

The third determination sub-module may be used to determine a first feedback result according to the registration information.

The first sending sub-module may be used to send the registration information to the at least one first other federation node, so that the at least one first other federation node determines at least one second feedback result according to the registration information.

The fourth determination sub-module may be used to determine a first overall feedback result according to the first feedback result and at least one second feedback result, in response to the at least one second feedback result being received.

The fifth determination sub-module may be used to determine the node to be registered as a newly added federation node of the weak federation system in response to a determination that the first overall feedback result meets the registration condition.

According to embodiments of the present disclosure, in a case that the current federation node is a node in a strong federation system, the fourth determination module may include a sixth determination sub-module and a seventh determination sub-module.

The sixth determination sub-module may be used to determine a first feedback result according to the registration information.

The seventh determination sub-module may be used to determine the node to be registered as a newly added federation node of the strong federation system in response to a determination that the first feedback result meets the registration condition.

According to embodiments of the present disclosure, the current system meta information includes at least one selected from: a federation node identification, a federation node weight information, a data model, or a query open permission information.

According to embodiments of the present disclosure, the data model includes at least one selected from a public domain data model or a private domain data model. The public domain data model is a data model that federation nodes of a federation system achieves a consensus on. The private domain data model is a data model that follows a same data rule as the public domain data model and that the federation nodes of the federation system do not achieves a consensus on.

According to embodiments of the present disclosure, in a case that the current federation node is a current leader federation node, the apparatus 500 of processing the information may further include a fifth determination module, a generation module, a fourth obtaining module, a fifth obtaining module, a sixth obtaining module, and a completion module.

The fifth determination module may be used to determine a plan to be executed, in response to a proposal request being received from a proposal federation node.

In response to a determination that the plan to be executed is passed:

The generation module is used to generate a proposal execution request for the plan to be executed.

The fourth obtaining module is used to execute the plan to be executed in response to the proposal execution request being received, so as to obtain a first execution result.

The fifth obtaining module is used to send the proposal execution request to at least one second other federation node, so that the at least one second other federation node executes the plan to be executed in response to the proposal execution request being received, so as to obtain at least one second execution result.

The sixth determination module is used to determine, in response to the at least one second execution result being received, an execution completion result according to the first execution result and the at least one second execution result.

The completion module is used to complete an execution of the plan to be executed, in response to a determination that the execution completion result is that the execution is successful.

According to embodiments of the present disclosure, a type of the plan to be executed includes at least one selected from: a data model change type, a federation node exit type, a query open permission information change type, or a federation node weight information change type.

According to embodiments of the present disclosure, the current system meta information includes a federation node weight information, and the type of the plan to be executed includes the federation node weight information change type.

According to embodiments of the present disclosure, in a case that the current federation node is a node in a weak federation system, the apparatus 500 of processing the information may further include a seventh determination module, a fourth sending module, an eighth determination module, and a ninth determination module.

The seventh determination module may be used to determine a third feedback result for the plan to be executed.

The fourth sending module may be used to send the plan to be executed to at least one second other federation node of the weak federation system, so that the at least one second other federation node determines at least one fourth feedback result according to the plan to be executed.

The eighth determination module may be used to determine, in response to the at least one fourth feedback result being received, a second overall feedback result according to the third feedback result and the at least one fourth feedback result.

The ninth determination module may be used to determine, according to the second overall feedback result, whether the plan to be executed is passed or not passed.

According to embodiments of the present disclosure, the current system meta information includes a federation node weight information, and the type of the plan to be executed includes the federation node weight information change type.

According to embodiments of the present disclosure, in a case that the current federation node is a node in a strong federation system, the apparatus 500 of processing the information may further include an eighth determination module and a ninth determination module.

The eighth determination module may be used to determine a third feedback result for the plan to be executed.

The ninth determination module may be used to determine, according to the third feedback result, whether the plan to be executed is passed or not passed.

According to embodiments of the present disclosure, the type of the plan to be executed includes the federation node exit type.

According to embodiments of the present disclosure, in a case that the current federation node being a node in a weak federation system, the apparatus 500 of processing the information may further include a tenth determination module, a fifth sending module, an eleventh determination module, and a twelfth determination module.

The tenth determination module may be used to determine a fifth feedback result for the plan to be executed.

The fifth sending module may be used to send the plan to be executed to at least one second other federation node of the weak federation system, so that the at least one second other federation node determines at least one sixth feedback result in response to the plan to be executed being received.

The eleventh determination module may be used to determine, in response to the at least one sixth feedback result being received, a third overall feedback result according to the fifth feedback result and the at least one sixth feedback result.

The twelfth determination module may be used to determine, according to the third overall feedback result, whether the plan to be executed is passed or not passed.

According to embodiments of the present disclosure, a type of the plan to be executed includes the federation node exit type.

According to embodiments of the present disclosure, in a case that the current federation node is a node in a strong federation system, the apparatus 500 of processing the information may further include a thirteenth determination module and a fourteenth determination module.

The thirteenth determination module may be used to determine a fifth feedback result for the plan to be executed.

The fourteenth determination module may be used to determine, according to the fifth feedback result, whether the plan to be executed is passed or not passed.

According to embodiments of the present disclosure, in a case that the current federation node is a current leader federation node, the apparatus 500 of processing the information may further include a sixth sending module, a seventh sending module, and an update module.

The sixth sending module may be used to send a communicative connection request to at least one third other federation node in response to a repair of fault being detected.

The seventh sending module may be used to send, in response to a new current leader federation node identification and a connection rejection information from the at least one third other federation node being received, a meta information acquisition request to a new current leader federation node corresponding to the new current leader federation node identification.

The update module may be used to update, in response to a new second current system meta information being received from the new current leader federation node, a graph database corresponding to the current federation leader node by using the new second current system meta information.

According to embodiments of the present disclosure, in a case that the current federation node is not a current leader federation node, the apparatus 500 of processing the information may further include an eighth sending module, a sixth obtaining module, and a ninth sending module.

The eighth sending module may be used to send a re-election request to at least one fourth other federation node in response to a fault of a current leader federation node being detected, so that the current federation node participates in an operation of electing a new current leader federation node.

The sixth obtaining module may be used to update the current system meta information to obtain a new third current system meta information in response to an election success information being received.

The ninth sending module may be used to send the new third current system meta information to at least one fifth other federation node, so that the at least one fifth other federation node updates a graph database corresponding to the fifth other federation node by using the new third current system meta information, and the election success information indicates that the current federation node is determined as the new current leader federation node.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor, and the memory stores instructions executable by the at least one processor, and the instructions, when executed by the at least one processor, cause the at least one processor to implement the method described in the present disclosure.

According to embodiments of the present disclosure, a non-transitory computer-readable storage medium having computer instructions therein is provided, and the computer instructions are used to cause a computer to implement the method described in the present disclosure.

According to embodiments of the present disclosure, a computer program product containing a computer program is provided, and the computer program, when executed by a processor, causes the processor to implement the method described in the present disclosure.

Figure 6:
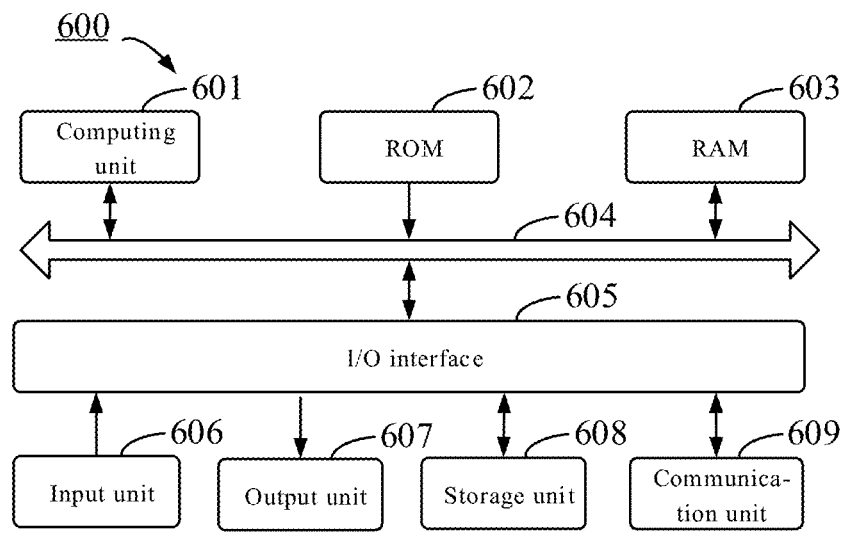
FIG. 6 schematically shows a block diagram of an electronic device suitable for implementing a method of processing an information according to embodiments of the present disclosure.

FIG. 6 schematically shows a block diagram of an electronic device suitable for implementing a method of processing an information according to embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the electronic device 600 includes a computing unit 601 which may perform various appropriate actions and processes according to a computer program stored in a read only memory (ROM) 602 or a computer program loaded from a storage unit 608 into a random access memory (RAM) 603. In the RAM 603, various programs and data necessary for an operation of the electronic device 600 may also be stored. The computing unit 601, the ROM 602 and the RAM 603 are connected to each other through a bus 604. An input/output (I/O) interface 605 is also connected to the bus 604.

A plurality of components in the electronic device 600 are connected to the I/O interface 605, including: an input unit 606, such as a keyboard, or a mouse; an output unit 607, such as displays or speakers of various types; a storage unit 608, such as a disk, or an optical disc; and a communication unit 609, such as a network card, a modem, or a wireless communication transceiver. The communication unit 609 allows the electronic device 600 to exchange information/data with other devices through a computer network such as Internet and/or various telecommunication networks.

The computing unit 601 may be various general-purpose and/or dedicated processing assemblies having processing and computing capabilities. Some examples of the computing units 601 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 601 executes various methods and steps described above, such as the method of processing the information. For example, in some embodiments, the method of processing the information may be implemented as a computer software program which is tangibly embodied in a machine-readable medium, such as the storage unit 608. In some embodiments, the computer program may be partially or entirely loaded and/or installed in the electronic device 600 via the ROM 602 and/or the communication unit 609. The computer program, when loaded in the RAM 603 and executed by the computing unit 601, may execute one or more steps in the method of processing the information described above. Alternatively, in other embodiments, the computing unit 601 may be used to perform the method of processing the information by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing an information, comprising:
   determining a first information to be queried, in response to receiving a first query request;
   querying an information associated with the first information to be queried from a current graph database, so as to obtain a first query result;
   determining at least one federation node to be queried, according to at least one of the first query result and the first information to be queried; and
   sending a second query request to the at least one federation node to be queried, so that the at least one federation node to be queried queries, in response to receiving the second query request, an information associated with a second information to be queried contained in the second query request from a graph database corresponding to the at least one federation node to be queried, so as to obtain at least one second query result;
   wherein the current graph database comprises at least one data version identification, a plurality of node information corresponding to the data version identification and at least one edge information corresponding to the data version identification, the node information comprises at least one node label of a node and at least one node attribute corresponding to the node label, the edge information comprises an edge label of an edge and at least one edge attribute corresponding to the edge label, and the edge label indicates a relationship between two nodes connected by the edge;
   wherein the first information to be queried comprises at least one selected from: a time period to be queried, a node to be queried, or an edge to be queried.

2. The method according to claim 1, wherein the first query result and the second query result are used by an initial federation node to generate a decision result for an initial information to be queried.

3. The method according to claim 1, wherein the determining at least one federation node to be queried, according to at least one of the first query result and the first information to be queried comprises:
   determining the at least one federation node to be queried according to a query open permission information and at least one of the first query result and the first information to be queried.

4. The method according to claim 1, wherein the first information to be queried comprises the time period to be queried and the node to be queried;
   wherein the querying an information associated with the first information to be queried from a current graph database, so as to obtain a first query result comprises:
   determining at least one target data version identification corresponding to the time period to be queried from at least one data version identification contained in the current graph database; and querying the information associated with the node to be queried from a plurality of nodes corresponding to the at least one target data version identification, so as to obtain the first query result.

5. The method according to claim 1, wherein each of the first information to be queried and the second information to be queried comprises at least one selected from an information to be queried regarding an existence and an information to be queried regarding a number-of-times.

6. The method according to claim 1, wherein in a case that the current federation node is not a current leader federation node, the method further comprises:
   sending a version identification acquisition request to the current leader federation node in response to a data change request being detected; and
   storing a data version identification and current changed data in an association manner in the current graph database in response to the data version identification being received from the current leader federation node.

7. The method according to claim 1, wherein in a case that the current federation node is a current leader federation node, the method further comprises:
   determining a registration information in response to a registration request being received from a node to be registered;
   determining the node to be registered as a newly added federation node in response to a determination that a registration condition being met; and
   updating a current system meta information according to the registration information, so as to obtain a new first current system meta information.

8. The method according to claim 7, further comprising:
   sending the new first current system meta information to the newly added federation node, so that the newly added federation node creates a graph database corresponding to the newly added federation node by using the new first current system meta information; and
   sending the new first current system meta information to at least one first other federation node, so that the at least one first other federation node updates a graph database corresponding to the first other federation node by using the new first current system meta information.

9. The method according to claim 7, wherein in a case that the current federation node is a node in a weak federation system, the determining the node to be registered as a newly added federation node in response to a determination that a registration condition being met comprises:
   determining a first feedback result according to the registration information;
   sending the registration information to the at least one first other federation node, so that the at least one first other federation node determines at least one second feedback result according to the registration information;
   determining a first overall feedback result according to the first feedback result and the at least one second feedback result, in response to the at least one second feedback result being received; and
   determining the node to be registered as a newly added federation node of the weak federation system in response to a determination that the first overall feedback result meets the registration condition.

10. The method according to claim 7, wherein in a case that the current federation node is a node in a strong federation system, the determining the node to be registered as a newly added federation node in response to a determination that a registration condition being met comprises:

determining a first feedback result according to the registration information; and determining the node to be registered as a newly added federation node of the strong federation system in response to a determination that the first feedback result meets the registration condition;

wherein the current system meta information comprises at least one selected from: a federation node identification, a federation node weight information, a data model, or a query open permission information.

11. The method according to claim 10, wherein the data model comprises at least one selected from a public domain data model or a private domain data model;

wherein the public domain data model is a data model that federation nodes of a federation system achieve a consensus on; and wherein the private domain data model is a data model that follows a same data rule as the public domain data model and that the federation nodes of the federation system do not achieve a consensus on.

12. The method according to claim 1, wherein in a case that the current federation node is a current leader federation node, the method further comprises:

determining a plan to be executed, in response to a proposal request being received from a proposal federation node; and in response to a determination that the plan to be executed is passed, generating a proposal execution request for the plan to be executed;

executing the plan to be executed in response to the proposal execution request being received, so as to obtain a first execution result;

sending the proposal execution request to at least one second other federation node, so that the at least one second other federation node executes the plan to be executed in response to the proposal execution request being received, so as to obtain at least one second execution result;

determining, in response to the at least one second execution result being received, an execution completion result according to the first execution result and the at least one second execution result; and completing an execution of the plan to be executed, in response to a determination that the execution completion result is that the execution is successful;

wherein a type of the plan to be executed comprises at least one selected from: a data model change type, a federation node exit type, a query open permission information change type, or a federation node weight information change type.

13. The method according to claim 12, wherein the current system meta information comprises a federation node weight information, and the type of the plan to be executed comprises the federation node weight information change type;

wherein in a case that the current federation node is a node in a weak federation system, the method further comprises:

determining a third feedback result for the plan to be executed;

sending the plan to be executed to at least one second other federation node of the weak federation system, so that the at least one second other federation node determines at least one fourth feedback result according to the plan to be executed;

determining, in response to the at least one fourth feedback result being received, a second overall feedback result according to the third feedback result and the at least one fourth feedback result; and determining, according to the second overall feedback result, whether the plan to be executed is passed or not passed.

14. The method according to claim 12, wherein the current system meta information comprises a federation node weight information, and the type of the plan to be executed comprises the federation node weight information change type;

wherein in a case that the current federation node is a node in a strong federation system, the method further comprises:

determining a third feedback result for the plan to be executed; and determining, according to the third feedback result, whether the plan to be executed is passed or not passed.

15. The method according to claim 12, wherein the type of the plan to be executed comprises the federation node exit type;

wherein in a case that the current federation node is a node in a weak federation system, the method further comprises:

determining a fifth feedback result for the plan to be executed;

sending the plan to be executed to at least one second other federation node of the weak federation system, so that the at least one second other federation node determines at least one sixth feedback result in response to the plan to be executed being received;

determining, in response to the at least one sixth feedback result being received, a third overall feedback result according to the fifth feedback result and the at least one sixth feedback result; and determining, according to the third overall feedback result, whether the plan to be executed is passed or not passed.

16. The method according to claim 12, wherein a type of the plan to be executed comprises the federation node exit type;

wherein in a case that the current federation node is a node in a strong federation system, the method further comprises:

determining a fifth feedback result for the plan to be executed; and determining, according to the fifth feedback result, whether the plan to be executed is passed or not passed.

17. The method according to claim 1, wherein in a case that the current federation node is a current leader federation node, the method further comprises:

sending a communicative connection request to at least one third other federation node in response to a repair of fault being detected;

sending, in response to a new current leader federation node identification and a connection rejection information from the at least one third other federation node being received, a meta information acquisition request to a new current leader federation node corresponding to the new current leader federation node identification; and updating, in response to a new second current system meta information being received from the new current leader federation node, a graph database corresponding to the current federation leader node by using the new second current system meta information;

wherein in a case that the current federation node is not a current leader federation node, the method further comprises:

sending a re-election request to at least one fourth other federation node in response to a fault of the current leader federation node being detected, so that the current federation node participates in an operation of electing a new current leader federation node;

updating the current system meta information to obtain a new third current system meta information in response to an election success information being received; and sending the new third current system meta information to at least one fifth other federation node, so that the at least one fifth other federation node updates a graph database corresponding to the fifth other federation node by using the new third current system meta information, wherein the election success information indicates that the current federation node is determined as the new current leader federation node.

18. An electronic device, comprising:

at least one processor; and a memory communicatively connected to the at least one processor, wherein the memory stores instructions executable by the at least one processor, and the instructions, when executed by the at least one processor, cause the at least one processor to:

determine a first information to be queried, in response to receiving a first query request;

query an information associated with the first information to be queried from a current graph database, so as to obtain a first query result;

determine at least one federation node to be queried, according to at least one of the first query result and the first information to be queried; and send a second query request to the at least one federation node to be queried, so that the at least one federation node to be queried queries, in response to receiving the second query request, an information associated with a second information to be queried contained in the second query request from a graph database corresponding to the at least one federation node to be queried, so as to obtain at least one second query result;

wherein the current graph database comprises at least one data version identification, a plurality of node information corresponding to the data version identification and at least one edge information corresponding to the data version identification, the node information comprises at least one node label of a node and at least one node attribute corresponding to the node label, the edge information comprises an edge label of an edge and at least one edge attribute corresponding to the edge label, and the edge label indicates a relationship between two nodes connected by the edge;

wherein the first information to be queried comprises at least one selected from: a time period to be queried, a node to be queried, or an edge to be queried.

19. A non-transitory computer-readable storage medium having computer instructions therein, wherein the computer instructions are configured to cause a computer to:

determine a first information to be queried, in response to receiving a first query request;

query an information associated with the first information to be queried from a current graph database, so as to obtain a first query result;

determine at least one federation node to be queried, according to at least one of the first query result and the first information to be queried; and send a second query request to the at least one federation node to be queried, so that the at least one federation node to be queried queries, in response to receiving the second query request, an information associated with a second information to be queried contained in the second query request from a graph database corresponding to the at least one federation node to be queried, so as to obtain at least one second query result;

wherein the current graph database comprises at least one data version identification, a plurality of node information corresponding to the data version identification and at least one edge information corresponding to the data version identification, the node information comprises at least one node label of a node and at least one node attribute corresponding to the node label, the edge information comprises an edge label of an edge and at least one edge attribute corresponding to the edge label, and the edge label indicates a relationship between two nodes connected by the edge;

wherein the first information to be queried comprises at least one selected from: a time period to be queried, a node to be queried, or an edge to be queried.

* * * * *